(12) United States Patent
Tsujita

(10) Patent No.: US 11,318,990 B2
(45) Date of Patent: May 3, 2022

(54) TRANSMITTER, RECEIVER, AND TRANSMISSION/RECEPTION SYSTEM

(71) Applicant: PACIFIC INDUSTRIAL CO., LTD., Ogaki (JP)

(72) Inventor: Yasuhisa Tsujita, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 402 days.

(21) Appl. No.: 16/315,124

(22) PCT Filed: Mar. 28, 2017

(86) PCT No.: PCT/JP2017/012742
§ 371 (c)(1),
(2) Date: Sep. 23, 2019

(87) PCT Pub. No.: WO2018/179109
PCT Pub. Date: Oct. 4, 2018

(65) Prior Publication Data
US 2020/0255065 A1     Aug. 13, 2020

(51) Int. Cl.
*B62D 15/02* (2006.01)
*B62D 5/04* (2006.01)
(Continued)

(52) U.S. Cl.
CPC .......... *B62D 15/024* (2013.01); *B60C 23/00* (2013.01); *B60C 23/04* (2013.01);
(Continued)

(58) Field of Classification Search
CPC .............. B62D 15/024; B62D 15/0245; B62D 5/0475; B62D 5/0481; B60C 23/00;
(Continued)

(56) References Cited

U.S. PATENT DOCUMENTS

2009/0322587 A1   12/2009   Stayton
2011/0169627 A1   7/2011    Fink
(Continued)

FOREIGN PATENT DOCUMENTS

EP   3088217 A1   2/2016
FR   2954226 A1   6/2011
(Continued)

OTHER PUBLICATIONS

Search Report for International Application No. PCT/JP2017/012742 dated May 9, 2017 (2 pages).
(Continued)

*Primary Examiner* — Orlando Bousono
(74) *Attorney, Agent, or Firm* — Cantor Colburn LLP

(57) ABSTRACT

A vehicle has a detecting section that detects, as a detection value, a rotational angle of each wheel assembly. A transmitter provided in each wheel assembly transmits transmission data when the rotational angle of the wheel assembly is any of specific angles. At the performance of transmission at the specific angle, the transmitter changes data that is different from angular data indicating the rotational angle of the wheel assembly and is included in the transmission data in accordance with the specific angle. A vehicle-mounted receiver collects the detection values detected by the detecting section upon reception of the transmission data. The receiver collects the detection values for each piece of the transmission data transmitted at the same specific angle based on a manner in which data included in the received transmission data is changed in accordance with the specific angle.

9 Claims, 9 Drawing Sheets

(51) Int. Cl.
*B60C 23/00* (2006.01)
*B60C 23/04* (2006.01)

(52) U.S. Cl.
CPC ........ *B60C 23/0415* (2013.01); *B62D 5/0475* (2013.01); *B62D 5/0481* (2013.01); *B62D 15/0245* (2013.01)

(58) Field of Classification Search
CPC ..... B60C 23/02; B60C 23/04; B60C 23/0408; B60C 23/0415; B60C 23/0416; B60C 23/0418; B60C 23/0438; B60C 23/0459; B60C 23/0462; B60C 23/0488; B60C 23/0489
See application file for complete search history.

(56) References Cited

U.S. PATENT DOCUMENTS

| | | |
|---|---|---|
| 2012/0259507 A1 | 10/2012 | Fink |
| 2014/0379291 A1 | 12/2014 | Mori et al. |
| 2016/0297263 A1 | 10/2016 | Watanabe et al. |
| 2017/0210185 A1* | 7/2017 | Sekizawa ............ B60C 23/0488 |
| 2018/0022171 A1* | 1/2018 | Okada ................ B60C 23/0416 701/33.4 |
| 2018/0134102 A1* | 5/2018 | Okada .................... G01P 15/00 |
| 2018/0257441 A1* | 9/2018 | Maehara ............ B60C 23/0489 |

FOREIGN PATENT DOCUMENTS

| | | |
|---|---|---|
| JP | 200694069 A | 4/2006 |
| JP | 2010525749 A | 7/2010 |
| JP | 2013133058 A | 7/2013 |
| JP | 5362000 A | 12/2013 |
| JP | 2014227124 A | 12/2014 |
| JP | 201678554 A | 5/2016 |
| JP | 2018112901 A | 7/2018 |

OTHER PUBLICATIONS

Extended European Search Report issued in European Application No. 17903919.3-1012, dated Mar. 14, 2019 and completed Feb. 25, 2019; 8 pages.

* cited by examiner

Fig.5A

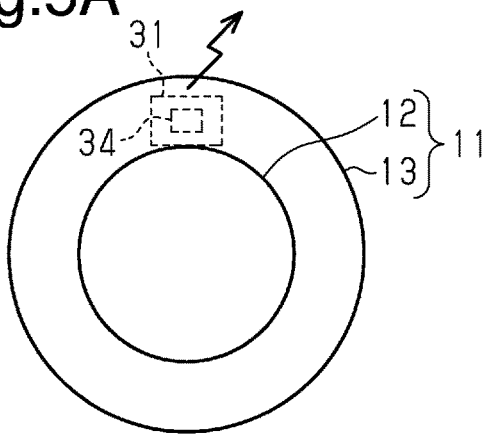

Fig.5B

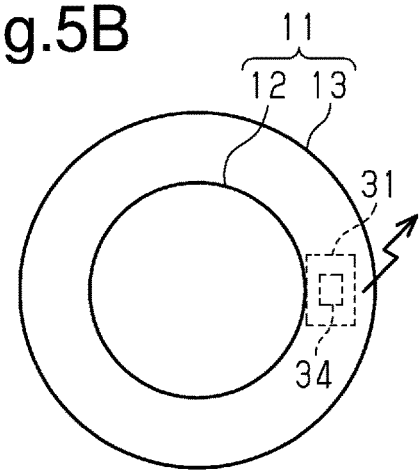

Fig.6

| Transmission Mode | Specific Angle Transmission | ID | Specific Bit |
|---|---|---|---|
| Normal Transmission | N/A | Transmit | 0 |
| Specific Angle Transmission | Transmit at First Angle | Transmit | 1 |
| | Transmit at Second Angle | Not Transmit | 1 |
| | Angle Detection Failed | Not Transmit | 0 |

Fig.7A

| Preamble | Identifying Code | ID Code | Fixed Bit | Pressure Data | Temperature Data | Status Code | Error Detection Code | Stop Bit |
|---|---|---|---|---|---|---|---|---|

Fig.7B

| Preamble | Identifying Code | Pressure Data | Temperature Data | Status Code | Error Detection Code | Stop Bit |
|---|---|---|---|---|---|---|

Fig.8A

| Contents | Number of Bits | Data String | |
|---|---|---|---|
| | | Hexadecimal | Binary |
| Preamble | 16 | - | - |
| Identifying Code | 2 | - | - |
| ID1 | 8 | FE | 11111110 |
| ID2 | 8 | 02 | 00000010 |
| ID3 | 8 | 1A | 00011010 |
| ID4 | 8 | 6B | 01101011 |
| Fixed Bit | 4 | 06 | 0110 |
| Pressure 1 | 4 | 07 | 0111 |
| Pressure 2 | 8 | B6 | 10110110 |
| Temperature | 8 | CD | 11001101 |
| Status 1 | 8 | 01 | 00000001 |
| Status 2 | 8 | 87 | 10000111 |
| Checksum | 8 | 17 | 00010111 |
| Stop Bit | 2 | - | - |
| Total | 100 | | |

Fig.8B

| Contents | Number of Bits | Data String | |
|---|---|---|---|
| | | Hexadecimal | Binary |
| Preamble | 16 | - | - |
| Identifying Code | 2 | - | - |
| Pressure 1 | 4 | 07 | 0111 |
| Pressure 2 | 8 | B6 | 10110110 |
| Temperature | 8 | CD | 11001101 |
| Status 1 | 8 | 01 | 00000001 |
| Status 2 | 8 | 87 | 10000111 |
| Checksum | 8 | 17 | 00010111 |
| Stop Bit | 2 | - | - |
| Total | 64 | | |

Fig.9

| Contents | Number of Bits | Data String | | | | | | | |
|---|---|---|---|---|---|---|---|---|---|
| | | FR | | FL | | RR | | RL | |
| | | Hexadecimal | Binary | Hexadecimal | Binary | Hexadecimal | Binary | Hexadecimal | Binary |
| ID1 | 8 | FE | 11111110 | FE | 11111110 | FE | 11111110 | FE | 11111110 |
| ID2 | 8 | 02 | 00000010 | 02 | 00000010 | 02 | 00000010 | 02 | 00000010 |
| ID3 | 8 | 1A | 00011010 | 1A | 00011010 | 1A | 00011010 | 1A | 00011010 |
| ID4 | 8 | 6B | 01101011 | 55 | 01010101 | 36 | 00110110 | 2A | 00101010 |
| Fixed Bit | 4 | 06 | 0110 | 06 | 0110 | 06 | 0110 | 06 | 0110 |

Fig.10

| Contents | Number of Bits | Data String | | | | | | | |
|---|---|---|---|---|---|---|---|---|---|
| | | FR | | FL | | RR | | RL | |
| | | Hexadecimal | Binary | Hexadecimal | Binary | Hexadecimal | Binary | Hexadecimal | Binary |
| ID1 | 8 | FE | 11111110 | FE | 11111110 | FE | 11111110 | FE | 11111110 |
| ID2 | 8 | 02 | 00000010 | 02 | 00000010 | 02 | 00000010 | 02 | 00000010 |
| ID3 | 8 | 1A | 00011010 | 1A | 00011010 | 1A | 00011010 | 1A | 00011010 |
| ID4 | 8 | 6B | 01101011 | 55 | 01010101 | 36 | 00110110 | 2A | 00101010 |
| Fixed Bit | 4 | 06 | 0110 | 06 | 0110 | 06 | 0110 | 06 | 0110 |
| Pressure 1 | 4 | 07 | 0111 | 07 | 0111 | 07 | 0111 | 07 | 0111 |
| Pressure 2 | 8 | B6 | 10110110 | B6 | 10110110 | B6 | 10110110 | B6 | 10110110 |
| Temperature | 8 | CD | 11001101 | CD | 11001101 | CD | 11001101 | CD | 11001101 |
| Status 1 | 8 | 01 | 00000001 | 01 | 00000001 | 01 | 00000001 | 01 | 00000001 |
| Status 2 | 8 | 87 | 10000111 | 87 | 10000111 | 87 | 10000111 | 87 | 10000111 |
| Received Checksum | 8 | 17 | 00010111 | 17 | 00010111 | 17 | 00010111 | 17 | 00010111 |
| Computed Checksum | 8 | 17 | 00010111 | 29 | 00101001 | 4A | 01001010 | 56 | 01010110 |
| Check Whether Checksum Match | | O | | X | | X | | X | |

| Transmission Mode | Specific Angle Transmission | Checksum |
|---|---|---|
| Normal Transmission | N/A | No Change |
| Specific Angle Transmission | Transmit at First Angle | Upper 4 Bits Inverted |
| | Transmit at Second Angle | Lower 4 Bits Inverted |
| | Angle Detection Failed | All 8 Bits Inverted |

Fig.14

| Transmission Mode | Specific Angle Transmission | CRC Generator Polynomial |
|---|---|---|
| Normal Transmission | N/A | $X^8+X^2+X+1$ |
| Specific Angle Transmission | Transmit at First Angle | $X^8+X^7+X^3+X^2+1$ |
| | Transmit at Second Angle | $X^8+X^5+X^4+1$ |
| | Angle Detection Failed | $X^8+X^7+X^6+X^4+X^2+1$ |

Fig.15

| Transmission Mode | Specific Angle Transmission | ID |
|---|---|---|
| Normal Transmission | N/A | No Change |
| Specific Angle Transmission | Transmit at First Angle | ID1 Inverted |
| | Transmit at Second Angle | ID2 Inverted |
| | Angle Detection Failed | ID3 Inverted |

TRANSMITTER, RECEIVER, AND TRANSMISSION/RECEPTION SYSTEM

TECHNICAL FIELD

The present invention relates to a transmitter, a receiver, and a transmission-reception system.

BACKGROUND ART

A transmission-reception system is known as an apparatus that allows a driver to check the condition of the tires of a vehicle from the passenger compartment. The transmission-reception system includes transmitters, which are respectively attached to wheel assemblies, and a receiver mounted on the vehicle. Each transmitter transmits transmission data including data indicating the condition of the tire to the receiver. The receiver receives the transmission data to acquire the condition of the tire.

In the transmission-reception system described above, it is preferable that the receiver can identify the tire to which the tire condition included in the transmission data corresponds. In other words, it is preferable that the receiver can identify the wheel assembly to which the transmitter that has transmitted the received transmission data is attached. This type of transmission-reception system is disclosed, for example, in Patent Document 1.

The transmission-reception system disclosed in Patent Document 1 is mounted on a vehicle including rotation angle detecting devices that detect the rotation angles of the wheel assemblies. Each transmitter transmits transmission data at predetermined specific angles. The receiver acquires the rotation angle of each wheel assembly from the detection result of the rotation angle detecting device upon reception of the transmission date. The receiver identifies the wheel assembly to which each of the transmitters is attached based on the variation of the rotation angle of each wheel assembly at the time of reception of the transmission data.

PRIOR ART DOCUMENT

Patent Document

Patent Document 1: Japanese Laid-Open Patent Publication No. 2014-227124

SUMMARY OF THE INVENTION

Problems that the Invention is to Solve

Some vehicles have a null point, at which signals of transmission data transmitted from the transmitters interfere with each other. When a specific angle at which the transmission data is transmitted matches the null point, the receiver cannot receive the transmission data transmitted at the specific angle. As a result, the receiver may be unable to identify the wheel assembly to which each transmitter is attached.

Accordingly, it is an objective of the present invention to provide a transmitter, a receiver, and a transmission-reception system that are capable of avoiding a situation in which, due to the influence of a null point, it is impossible to identify the wheel assembly to which each transmitter is attached.

Means for Solving the Problems

To achieve the foregoing objective, a transmitter is provided that is provided in each wheel assembly of a vehicle and is configured to be capable of transmitting transmission data to a receiver mounted in the vehicle. The vehicle has a rotation angle detecting section that detects a rotation angle of each of the wheel assemblies as a detection value. The transmitter includes a transmission storage section, which stores identification information, a transmission section, and a control section. The transmission section is configured to transmit the transmission data including verification data, which is used by the receiver to verify the identification information stored in the transmission storage section against identification information of each transmitter registered in the receiver. The control section is capable of performing specific angle transmission, in which the control section causes the receiver to identify the wheel assembly to which the corresponding transmitter is attached by causing the transmission section to transmit the transmission data when detecting that the rotation angle of the corresponding wheel assembly is any one of a plurality of predetermined specific angles. The control section is configured to cause the receiver to collect the detection values, which are detected by the rotation angle detecting section, upon reception of the transmission data for each piece of the transmission data transmitted at the same specific angle by changing, at the performance of transmission at the specific angle, data that is different from angular data indicating the rotation angle of the wheel assembly and is included in the transmission data in accordance with the specific angle.

Each transmitter transmits transmission data at the specific angles when performing transmission at the specific angle. Even if any of the specific angles matches the null point, the receiver can receive the transmission data transmitted at a specific angle that does not match the null point. When the transmission data is transmitted at multiple specific angles, the receiver needs to collect detection values of the transmission data transmitted at each specific angle upon reception of the transmission data.

The control section of each transmitter changes the data included in the transmission data in accordance with each specific angle. Thus, when receiving transmission data, the receiver can recognize that the transmission data including the data that has been changed in the same manner was transmitted at the same specific angle. Therefore, it is possible to identify the wheel assembly to which each transmitter is attached from transmission data transmitted at multiple specific angles. Accordingly, it is possible to avoid a situation in which, due to the influence of a null point, it is impossible to identify the wheel assembly to which each transmitter is attached.

In the above transmitter, the control section may change, in accordance with the specific angle, data that is used as the verification data between the identification information and computation data, which is computed from the identification information and variable data that may have different values. The computation data has a data length shorter than that of the identification information.

This configuration allows the data length of the transmission data to be changed depending on whether the identification information or the computation data is used as the verification data. The receiver is thus capable of recognizing the transmission data transmitted at the same specific angle based on the data length.

In the above transmitter, the control section may change the identification information in the data included in the transmission data in accordance with the specific angle.

This configuration allows the receiver to recognize the transmission data transmitted at the same specific angle based on the identification information.

In the above transmitter, the control section may change a manner of computation of an error detection code or an error correction code in accordance with the specific angle.

This configuration allows the receiver to recognize the transmission data transmitted at the same specific angle based on the error detection code or the error correction code included in the received transmission data.

To achieve the foregoing objective, a receiver is provided that is mounted on a vehicle having a rotation angle detecting section that detects rotation angles of respective wheel assemblies. A transmitter is attached to each wheel assembly. The receiver is configured to be capable of identifying the wheel assembly to which each transmitter is attached. The receiver includes a reception storage section, which stores identification information registered in each transmitter, a reception section, and an identifying section. The reception section is configured to be capable of receiving transmission data, which is transmitted from the transmitter, which is capable of transmitting the transmission data when detecting that the rotation angle of the corresponding wheel assembly is any one of a plurality of predetermined specific angles. The identifying section collects the detected values detected by the rotation angle detecting section upon reception of the transmission data and identifies the wheel assembly to which each transmitter is attached based on a variation of the detection values. The identifying section collects the detection values for each piece of the transmission data transmitted at the same specific angle based on a manner in which data that is different from angular data indicating the rotation angle of the wheel assembly and is included in the transmission data received by the reception section is changed in accordance with the specific angle.

Based on the manner in which the received transmission data has been changed in accordance with the specific angle, the identifying section is capable of collecting the detection values of sets of transmission data transmitted at the same specific angle upon reception of the transmission data. Therefore, even if the transmission data is transmitted at multiple specific angles, it is possible to identify the wheel assembly to which each transmitter is attached by collecting the detection values of sets of the transmission data transmitted at the same specific angle. Accordingly, it is possible to avoid a situation in which, due to the influence of a null point, it is impossible to identify the wheel assembly to which each transmitter is attached.

The above receiver may include a verifying section, which performs a verification process to verify the identification information registered in the transmitter that has transmitted the transmission data against the identification information stored in the reception storage section based on verification data included in the transmission data received by the reception section and the identification information stored in the reception storage section. The verification data is the identification information registered in the transmitter or computation data that is computed from the identification information registered in the transmitter and variable data that may have different values, the computation data having a data length shorter than that of the identification information registered in the transmitter. When receiving the identification information as the verification data, the verifying section performs the verification process based on the received identification information and the identification information stored in the reception storage section. When receiving the computation data as the verification data, the verifying section performs the verification process based on the computation data and data computed from the variable data included in the transmission data and the identification information stored in the reception storage section. The identifying section collects the detection values for each piece of the transmission data transmitted at the same specific angle based on a manner in which the data length of the transmission data is changed in accordance with the specific angle.

This configuration allows the identifying section to recognize whether the transmission data was transmitted at the same specific angle based on the difference in data length of the transmission data due to the difference in data length of the verification data.

In the above receiver, the identifying section may collect the detection values for each piece of the transmission data transmitted at the same specific angle based on verification of identification information that is included in the received transmission data and varies in accordance with the specific angle against the identification information stored in the reception storage section.

This configuration allows the identifying section to recognize whether the transmission data was transmitted at the same specific angle based on the identification information.

The identifying section may compute an error detection code or an error correction code in a plurality of manners of computation from the transmission data received by the reception section. Also, the identifying section may collect the detection values for each piece of the transmission data transmitted at the same specific angle based on comparison between the code obtained through the computation and an error detection code or an error correction code that is included in the transmission data and is computed in a manner of computation that varies in accordance with the specific angle.

This configuration allows the identifying section to recognize whether the transmission data was transmitted at the same specific angle based on the error detection code or the error correction code.

To achieve the foregoing objective, a transmission-reception system is provided that includes a plurality of transmitters and a receiver. The transmitters are each provided in a wheel assembly of a vehicle having a rotation angle detecting section that detects, as a detection value, a rotation angle of each of a plurality of wheel assemblies. The transmitter is configured to transmit transmission data. The receiver receives the transmission data and is configured to be capable of identifying the wheel assembly to which each transmitter is attached. Each transmitter includes a transmission storage section, which stores identification information, a transmission section, and a control section. The transmission section is configured to transmit the transmission data including verification data, which is used by the receiver to verify the identification information stored in the transmission storage section against identification information of each transmitter registered in the receiver. The control section causes the transmission section to transmit the transmission data when detecting that the rotation angle of the corresponding wheel assembly is any one of a plurality of predetermined specific angles. The control section changes, at the performance of transmission at the specific angle, data that is different from angular data indicating the rotation angle of the wheel assembly and is included in the transmission data in accordance with the specific angle. The receiver includes a reception storage section, which stores identification information registered in each transmitter, a reception section, which is configured to be capable of receiving the transmission data, and an identifying section, which collects the detected values detected by the rotation angle detecting section upon reception of the transmission data and identifies the wheel assembly to which each transmitter is attached based on a variation of the detection values. The identifying section collects the detection values for each piece of the transmission data transmitted at the same specific angle based on a manner in which data included in the transmission data is changed in accordance with the specific angle.

Effects of the Invention

The present invention is capable of avoiding a situation in which, due to the influence of a null point, it is impossible to identify the wheel assembly to which each transmitter is attached.

BRIEF DESCRIPTION OF THE DRAWINGS

FIG. 5A is a diagram illustrating a first angle.

FIG. 5B is a diagram illustrating a second angle.

FIG. 6 is a diagram illustrating the correspondence between the transmission mode and the form of the transmission data in the first embodiment.

FIG. 7A is a schematic diagram illustrating the frame format of first data.

FIG. 7B is a schematic diagram illustrating the frame format of second data.

FIG. 8A is a diagram illustrating one example of the first data.

FIG. 8B is a diagram illustrating one example of the second data.

FIG. 9 is a diagram illustrating one example of ID codes stored in the reception storage section.

FIG. 10 is a diagram illustrating one example of variable data included in the second data and the error detection codes computed from the ID codes stored in the reception storage section.

FIG. 14 is a diagram illustrating the correspondence between the transmission mode and the form of the transmission data in the third embodiment.

FIG. 15 is a diagram illustrating a transmission mode and the form of the transmission data according to a modification.

MODES FOR CARRYING OUT THE INVENTION

First Embodiment

A transmitter, a receiver, and a transmission-reception system according to a first embodiment will now be described.

Figure 1B:
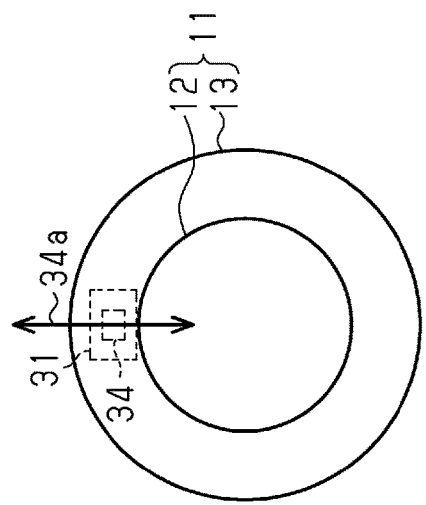
FIG. 1B is a schematic diagram illustrating the relationship between each wheel assembly of the vehicle and the detection axis of an acceleration sensor.
Figure 1A:
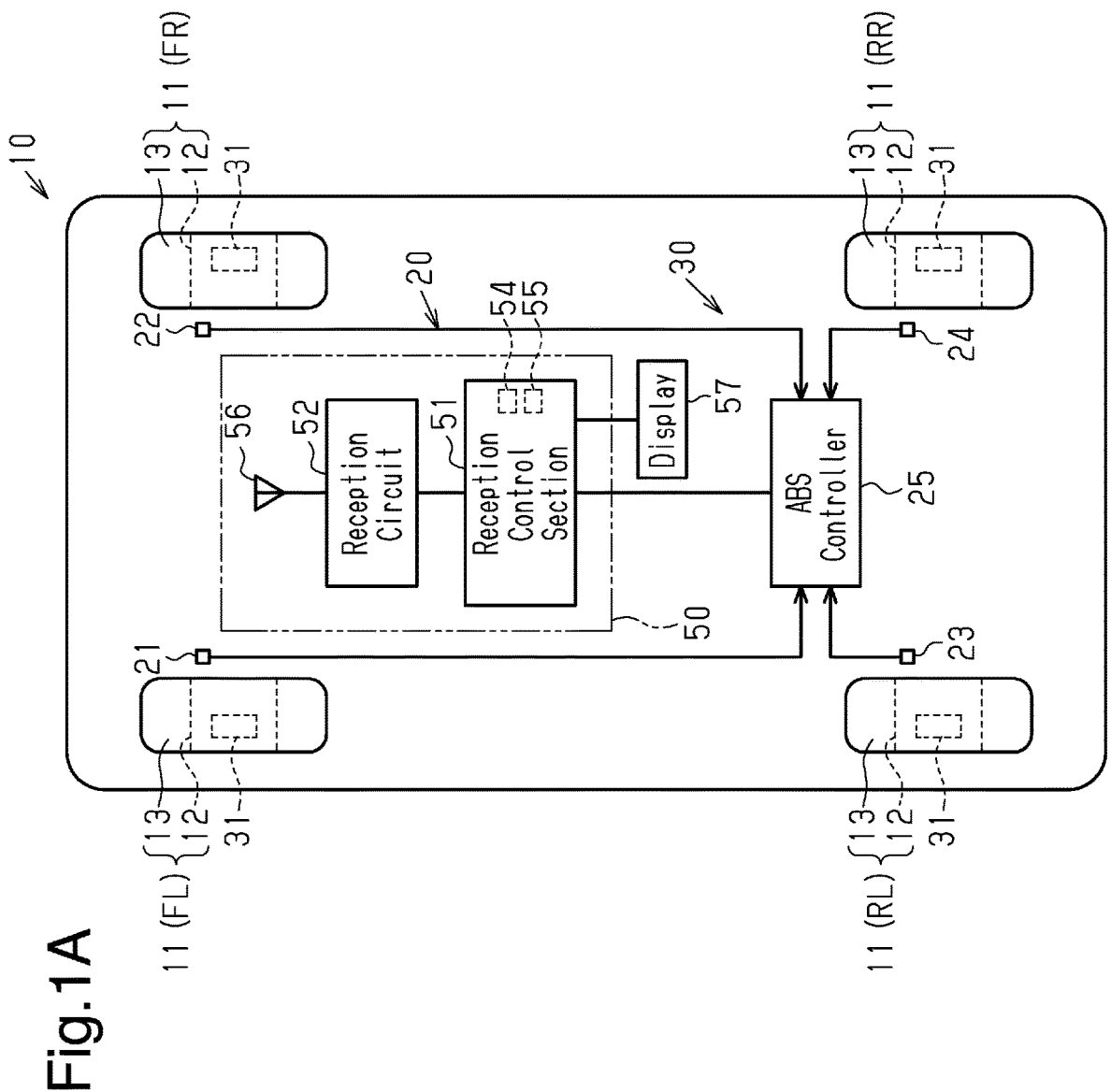
FIG. 1A is a schematic diagram of a vehicle equipped with a tire condition monitoring system.

As shown in FIG. 1A, a tire condition monitoring system 30, which is a transmission-reception system, is mounted on a vehicle 10. First, the vehicle 10, on which the tire condition monitoring system 30 is mounted, will be described.

The vehicle 10 includes four wheel assemblies 11. Each wheel assembly 11 includes a wheel 12 and a tire 13 attached to the wheel 12. When necessary, the wheel assembly 11 at the right front side will be denoted by FR, the wheel assembly 11 at the left front side will be denoted by FL, the wheel assembly 11 at the right rear side will be denoted by RR, and the wheel assembly 11 at the left rear side will be denoted by RL.

The vehicle 10 includes an antilock braking system (ABS) 20. The ABS 20 includes an ABS controller 25, and rotation sensor units 21 to 24 respectively corresponding to the four wheel assemblies 11 of the vehicle 10. The first rotation sensor unit 21 corresponds to the left front wheel assembly FL, and the second rotation sensor unit 22 corresponds to the right front wheel assembly FR. The third rotation sensor unit 23 corresponds to the left rear wheel assembly RL, and the fourth rotation sensor unit 24 corresponds to the right rear wheel assembly RR. The ABS controller 25 is configured by a microcomputer or the like so as to obtain the rotation angle of each of the wheel assemblies 11 based on signals from the rotation sensor units 21 to 24.

Figure 2:
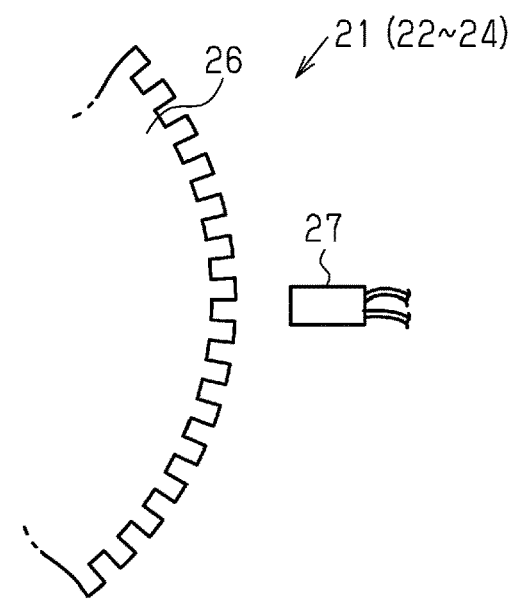
FIG. 2 is a schematic diagram of a rotation sensor unit.
Figure 3:
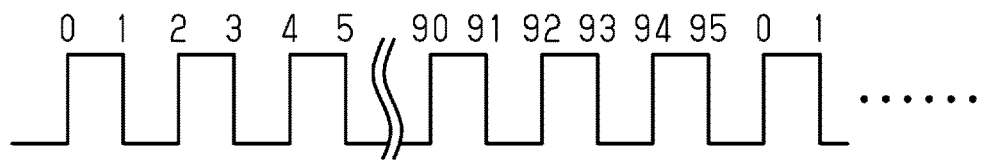
FIG. 3 is a schematic diagram of pulses generated by rotation of the wheel assembly.

As shown in FIG. 2, each of the rotation sensor units 21 to 24, which serve as a rotation angle detecting section, includes a gear 26, which rotates integrally with the wheel assembly 11, and a detector 27 arranged to face the outer circumferential surface of the gear 26. The gear 26 has multiple teeth (forty-eight teeth in the present embodiment) at equal angular intervals on the outer circumferential surface. The detector 27 detects pulses generated by rotation of the gear 26. The ABS controller 25 is connected to the detector 27 by wire and obtains the rotation angle of each of the wheel assemblies 11 based on a count value of the pulses (hereinafter, referred to as a pulse count value) as a detection value of each of the detectors 27. Specifically, when the gear 26 is rotated, the pulses corresponding to the number of the teeth are generated in the detector 27. The ABS controller 25 counts the pulses generated in the detector 27. As shown in FIG. 3, the ABS controller 25 counts from 0 to 95 by counting rising edges and falling edges of pulses in the present embodiment.

The tire condition monitoring system 30 will now be described.

As shown in FIG. 1A, the tire condition monitoring system 30 includes transmitters 31 and a receiver 50. Each transmitter 31 is attached to one of the four wheel assemblies 11 of the vehicle 10. The receiver 50 is installed in the vehicle 10. The transmitter 31 is attached to the wheel assembly 11 so as to be arranged in the inner space of the tire 13. The transmitter 31 is fixed to the tire valve, the wheel 12, or the tire 13. The transmitter 31 detects the condition (for example, the tire air pressure and tire internal temperature) of the corresponding tire 13 and wirelessly transmits transmission data including detected information of the tire 13 to the receiver 50. The tire condition monitoring system 30 monitors the condition of the tire 13 by receiving the transmission data transmitted from the transmitter 31 through the receiver 50.

Figure 4:
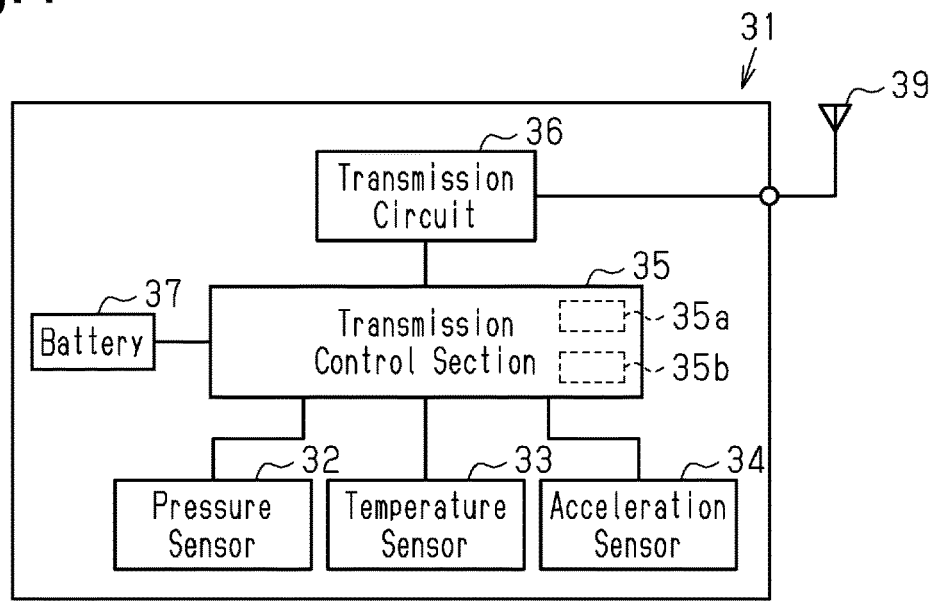
FIG. 4 is a schematic diagram of a transmitter.

As shown in FIG. 4, each of the transmitters 31 includes a pressure sensor 32, a temperature sensor 33, an acceleration sensor 34, a transmission control section 35, a transmission circuit 36, a battery 37, and a transmission antenna 39. The transmitter 31 is driven by power supplied from the battery 37, and the transmission control section 35 controls operation of the transmitter 31 in an integrated manner. The battery 37 may be a primary battery or a power storage device such as a rechargeable battery and a capacitor.

The pressure sensor 32 detects the air pressure of the corresponding tire 13. The pressure sensor 32 outputs the detection result to the transmission control section 35. The temperature sensor 33 detects the temperature inside the corresponding tire 13. The temperature sensor 33 outputs the detection result to the transmission control section 35.

As shown in FIG. 1B, the acceleration sensor 34 includes a detection axis 34a so as to detect acceleration in the direction along the detection axis 34a. The acceleration sensor 34 outputs the detection result to the transmission control section 35. The acceleration sensor 34 may be a uniaxial acceleration sensor 34 or a multiaxial acceleration sensor 34.

The acceleration sensor 34 is arranged such that the detection axis 34a is directed (downward) in the vertical direction when the transmitter 31 is located at the lowermost position (or the uppermost position) of the wheel assembly 11.

If a multiaxial acceleration sensor having a detection axis other than the detection axis 34a is employed is used as the acceleration sensor 34, the acceleration applied along each of the detection axes is independently detected. Hereinafter, the acceleration detected by the acceleration sensor 34 denotes acceleration detected in the detection axis 34a.

As shown in FIG. 4, the transmission control section 35 is configured by a microcomputer or the like including a CPU 35a and a transmission storage section 35b (a RAM, a ROM and the like). An ID code indicating individual identification information of each of the transmitters 31 is stored in the transmission storage section 35b. Accordingly, an ID code is registered in each transmitter 31. For the illustrative purposes, the ID code of the transmitter 31 attached to the left front wheel assembly FL will be denoted by FLID, the ID code of the transmitter 31 attached to the right front wheel assembly FR will be denoted by FRID, the ID code of the transmitter 31 attached to the left rear wheel assembly RL will be denoted by RLID, and the ID code of the transmitter 31 attached to the right rear wheel assembly RR will be denoted by RRID.

The transmission storage section 35b stores various programs for controlling the transmitter 31. The programs include a program for switching the form of the transmission data transmitted from the transmitter 31. The transmission control section 35 includes a timing function. The timing function is implemented by, for example, a timer or a counter.

The transmission control section 35 obtains detection results detected by the pressure sensor 32, the temperature sensor 33, and the acceleration sensor 34 at a predetermined obtaining interval.

The transmission control section 35 generates transmission data including, for example, a tire condition (for example, the tire air pressure and the tire internal temperature) based on the detection result. The transmission data is digital data and is a data string of binary numbers or a hexadecimal numbers. The transmission control section 35 outputs the generated transmission data to the transmission circuit 36. The transmission circuit 36 modulates the transmission data output from the transmission control section 35. The modulated transmission data is transmitted from the transmission antenna 39 as a wireless signal. The wireless signal is a signal including the transmission data. The wireless signal is transmitted as a signal of an RF band (for example, a 315 MHz band and a 434 MHz band). In the present embodiment, the transmission circuit 36 serves as a transmission section, and the transmission control section 35 serves as a control section that transmits transmission data from the transmission circuit 36.

The transmission control section 35 determines whether the vehicle 10 is traveling or in a stopped state based on the acceleration detected by the acceleration sensor 34. The centrifugal acceleration acting on the acceleration sensor 34 increases as the vehicle speed increases. If the acceleration detected by the acceleration sensor 34 is greater than or equal to a travel determination threshold value, the transmission control section 35 determines that the vehicle 10 is traveling. If the acceleration detected by the acceleration sensor 34 is less than the travel determination threshold value, the transmission control section 35 determines that the vehicle 10 is in a stopped state. The travel determination threshold value is set to a value greater than the acceleration detected by the acceleration sensor 34 when the vehicle 10 is in a stopped state, while taking the tolerance into consideration.

The transmitter 31 of the present embodiment executes two different transmission modes for transmitting transmission data: normal transmission, in which the transmission data is transmitted regardless of the rotation angle of the wheel assembly 11, and specific angle transmission, in which the transmission data is transmitted when the rotation angle of the wheel assembly 11 matches a predetermined specific angle.

In the normal transmission, the transmission data is transmitted at a predetermined interval. The predetermined interval is set to, for example, ten seconds to several tens of seconds.

For example, the specific angle transmission is executed when the vehicle 10 is started to travel after the vehicle 10 has been in a stopped state continuously for a predetermined time or longer. The predetermined time is set to a time in which a tire can be replaced, for example, several tens of minutes to several hours. That is, the specific angle transmission is executed when the position of the wheel assembly 11 has possibly been changed due to tire rotation.

In the specific angle transmission, the transmission data is transmitted when the rotation angle of the wheel assembly 11 is detected to match the predetermined specific angle. Specifically, the transmission data is transmitted when a specific angle is detected and a predetermined time (for example, ten seconds to several tens of seconds) has elapsed since the last transmission of the transmission data. Also, the transmission data is transmitted when the detection of a specific angle has failed, that is, when the specific angles cannot be detected after the predetermined time has elapsed since the last transmission of the transmission data. In this case, the transmission data will be transmitted at a non-specific angle.

As shown in FIGS. 5A and 5B, multiple specific angles are set. In the present embodiment, the specific angles include a first angle, at which the transmitter 31 is located at the uppermost position in the wheel assembly 11, and a second angle, at which the transmitter 31 is located at the rearmost position in the wheel assembly 11. When the first angle is defined as a reference (0°), the second angle is 270°. The transmission data may be transmitted alternately at the first angle and the second angle or may be transmitted at random.

Whether the transmitter 31 is located at a position corresponding to a specific angle can be detected based on the acceleration detected by the acceleration sensor 34. As described above, the direction in which the detection axis 34a extends is the same as the direction in which the centrifugal force is applied regardless of the rotation angle of the wheel assembly 11. Thus, the acceleration sensor 34 detects the centrifugal acceleration regardless of the rotation angle of the wheel assembly 11. On the other hand, the gravitational acceleration is always applied in the vertical direction. Thus, in a case in which the detection axis 34a is not directed in the vertical direction, the acceleration sensor 34 detects a component force of the gravitational acceleration (a component of the gravitational acceleration). The acceleration sensor 34 detects an acceleration obtained by adding the gravitational acceleration to the centrifugal acceleration.

Unless the vehicle 10 is abruptly accelerated or stopped, the centrifugal acceleration changes only slightly in one turn of the wheel assembly 11. Accordingly, the acceleration changed in one turn of the wheel assembly 11 is deemed as the gravitational acceleration. Thus, whether the rotation angle of the wheel assembly 11 matches a specific angle can be detected by using changes in the gravitational acceleration. When only the gravitational acceleration is considered, the gravitational acceleration changes in one turn of the wheel assembly 11 in a range between +1 G and −1 G. In the present embodiment, the gravitational acceleration is +1 G when the transmitter 31 is located at the lowermost position of the wheel assembly 11, and the gravitational acceleration is −1G when the transmitter 31 is located at the uppermost position of the wheel assembly 11.

A "specific angle" is the rotation angle of the wheel assembly 11 including the allowable range (angle range). Errors can occur between a specific angle and the rotation angle of the wheel assembly 11 when the transmission data is actually transmitted due to various factors such as the frequency at which the transmission control section 35 obtains the acceleration and detection errors of the acceleration sensor 34. A "specific angle" does not only indicate an angle completely matching the specific angle but includes a permissible range with errors taken into consideration.

Next, the protocol (frame format) of the transmission data will be described.

As shown in FIG. 6, in the present embodiment, two sets of transmission data having different frame formats are transmitted in accordance with the transmission mode of the transmitter 31 and the rotation angle of the wheel assembly 11 when transmitting the transmission data. In the present embodiment, the transmission data is transmitted in the same frame format when performing the normal transmission and when performing transmission at the first angle in the specific angle transmission. Hereinafter, this transmission data will be referred to as first data. The first data is transmission data that includes the ID code.

The transmission data is transmitted in the same frame format when transmission is performed at the second angle during a specific angle transmission and when a specific angle cannot be detected in the specific angle transmission. Hereinafter, this transmission data will be referred to as second data. The second data is transmission data that does not include the ID code.

As shown in FIGS. 7A and 8A, the first data includes a preamble, an identifying code, an ID code, a fixed bit, pressure data, temperature data, a status code, an error detection code, which is a code for detecting errors, and a stop bit. The first data is 100-bit data in total. The first data of the present embodiment does not include the angular data, which indicates the rotation angle of the wheel assembly 11 at the time of transmission of the transmission data.

The ID code is 32-bit data. The ID code is stored in the transmission storage section 35b and is always the same unless the ID code is changed. Thus, the ID code is the fixed data having a fixed value.

The fixed bit is 4-bit data. The fixed bit is, for example, data for computing the error detection code. The fixed bit in the present embodiment is a predetermined value (fixed value). The ID codes of the four transmitters 31 differ from each other, but the fixed bit is the same.

The pressure data is 12-bit data. The pressure data is data indicating the pressure detected by the pressure sensor 32, that is, the air pressure of the tire 13. The pressure detected by the pressure sensor 32 fluctuates. Thus, the pressure data is variable data that may have different values.

The temperature data is 8-bit data. The temperature data is data indicating the temperature detected by the temperature sensor 33, that is, the temperature in the tire 13. The temperature detected by the temperature sensor 33 fluctuates. Thus, the temperature data is variable data that may have different values. In the tire condition monitoring system 30, the pressure data and the temperature data are the payload data, that is, the data that are intended to be received by the receiver 50.

The status code is 16-bit data. The status code is the data indicating the condition of the transmitter 31. The status code is variable data that may have different values. The status code includes a bit indicating whether the transmission data was transmitted at a specific angle (hereinafter referred to as a specific bit). When transmitting the transmission data at the specific angle, the transmission control section 35 sets the specific bit to 1. When transmitting the transmission data at a rotation angle different from the specific angle, the transmission control section 35 sets the specific bit to 0. In the normal transmission, the specific bit is always 0.

The error detection code is 8-bit data. In the present embodiment, the error detection code is used as a code for detecting errors. However, instead of the error detection code, an error correction code may be used. That is, a code for performing error detection refers to, besides an error detection code that performs only error detection, an error correction code that performs correction of errors in addition to error detection.

The error detection code may be any error detection code such as a parity bit, a checksum, mirror data, and a CRC code. The error correction code may be any error correction code such as a BCH code, an RS code, a Hamming code, a turbo code, and a convolutional code.

In the present embodiment, the checksum is used as the error detection code. The checksum is computed from the ID code, the fixed bit, the pressure data, the temperature data, and the status code. In the present embodiment, since the checksum includes 8 bits, the data used for computing the checksum is set to 8 bits.

As illustrated in FIG. 8A, the 32-bit ID code is divided into four, so that each piece of the divided data includes 8 bits. FIG. 8A illustrates the divided ID codes as ID1, ID2, ID3, and ID4. FIG. 8A illustrates an example of the first data transmitted from the transmitter 31 mounted on the front right wheel assembly FR, that is, the transmitter 31 of the FRID.

The 12-bit pressure data is divided into two, and one of the pieces of the divided data includes 4 bits and the other one of the pieces of the divided data includes 8 bits. FIG. 8A illustrates 4-bit data of the divided data as a pressure 1 and the 8-bit data of the divided data as a pressure 2. The pressure 1, which is the 4-bit data, and the fixed bit, which includes 4 bits, are combined to form 8-bit data. More specifically, 8-bit data is generated that includes the fixed bit as the upper 4 bits and the pressure 1 as the lower 4 bits.

The 16-bit status code is divided into two, and each piece of the divided data includes 8 bits. FIG. 8A illustrates the divided status codes as a status 1 and a status 2.

When generating the transmission data, the transmission control section 35 computes the checksum based on the sum of multiple pieces of data combined to form the 8-bit data. The checksum is a value equivalent to the exclusive OR of the above-described pieces of data.

The preamble is 16-bit data. The identifying code is 2-bit data. The stop bit is 2-bit data. The preamble, the identifying code, and the stop bit are data set by, for example, a protocol. These pieces of data are not used to compute the error detection code. FIGS. 8A and 8B omit the data strings of the pieces of data not used to compute the error detection code.

The second data will now be described.

As illustrated in FIGS. 7B and 8B, the second data refers to the transmission data obtained by omitting the ID code and the fixed bit from the first data. The second data is shorter in the data length than the first data by the length corresponding to the ID code and the fixed bit and is 64-bit data.

When transmission data is transmitted at the first angle and the second angle in the specific angle transmission, the specific bit is 1. If detection of a specific angle fails and the transmission data is transmitted at the non-specific angle, the specific bit is 0.

As illustrated in FIG. 8B, in the second data, the ID code and the fixed bit are omitted. However, the error detection code computed in the same manner as the first data is used. More specifically, the error detection code computed from the ID code, the fixed bit, the pressure data, the temperature data, and the status code is used. That is, the second data is the transmission data that includes the error detection code computed based on data including the ID code and the fixed bit, but does not include the ID code or the fixed bit. FIG. 8B illustrates an example of the second data transmitted from the transmitter 31 mounted on the front right wheel assembly FR, that is, the transmitter 31 of the FRID.

The first data and the second data are different in the data other than the angular data (the data not indicating the rotation angle of the wheel assembly). Specifically, the first data and the second data are different in whether they include an ID code and a fixed bit. Accordingly, the data length is different between the first data and the second data.

The receiver 50 will now be described.

As shown in FIG. 1A, the receiver 50 includes a reception control section 51, a reception circuit 52, and a reception antenna 56. The reception control section 51 is connected to a display 57 mounted on the vehicle 10. The reception control section 51 is configured by a microcomputer or the like including a reception CPU 54 and a reception storage section 55 (a ROM, a RAM and the like). The reception control section 51 includes a timing function. The timing function is implemented by, for example, a timer or a counter. The reception circuit 52 demodulates the wireless signal received from each of the transmitters 31 via the reception antenna 56 and outputs the transmission data to the reception control section 51. The reception circuit 52 serves as a reception section.

The reception control section 51 acquires the condition of the tire 13 (for example, the tire air pressure and the tire internal temperature) based on the transmission data from the reception circuit 52. When an anomaly occurs in the tire 13, the reception control section 51 executes informing by using the display 57. The display 57 displays the pressure of each of the tires 13 in association with the positions of the wheel assemblies 11.

The reception storage section 55 stores the ID codes and the fixed bits of the four transmitters 31 mounted on the wheel assemblies 11 of the vehicle 10, on which the receiver 50 is mounted. Accordingly, the ID codes are registered in the receiver 50. The transmission storage sections 35b and the reception storage section 55 store the same ID codes, so that the receiver 50 and the transmitters 31 are associated with each other. The reception control section 51 recognizes only the transmission data transmitted from the four transmitters 31, which are attached to the wheel assemblies 11 of the vehicle 10 equipped with the receiver 50, as the transmission data transmitted to the reception control section 51. The reception control section 51 performs a verification process to verify the identification information (ID code) registered in the transmitter 31 that transmitted the transmission data against the identification information (ID codes) registered in the receiver 50 based on the transmission data received by the reception circuit 52 and the ID code stored in the reception storage section 55. When determining that the transmission data was transmitted from a transmitter 31 associated with the receiver 50, the reception control section 51 employs that data as data (pressure data and temperature data) indicating the condition of the tire 13 included in the transmission data as the data of the vehicle 10 on which the receiver 50 is mounted. In the following description, for the illustrative purposes, the transmission data transmitted from the transmitters 31 that are associated with the receiver 50, that is, the transmission data transmitted from the transmitters 31 in which the ID codes that are the same as the ID codes stored in the reception storage section 55 are registered will be referred to as authorized data. The data that is different from the authorized data, that is, the transmission data transmitted from a transmitter 31 that is not associated with the receiver 50 will be referred to as non-authorized data.

As described above, the transmitters 31 transmit the first data and the second data as the transmission data. The process performed by the reception control section 51 for verification of the ID codes differs between the case in which the first data is received as the transmission data and the case in which the second data is received as the transmission data.

If the reception circuit 52 receives the first data, the reception control section 51 obtains the ID code included in the first data and verifies the ID code against the ID code stored in the reception storage section 55. Thus, in the first data, the ID code serves as the verification data. If the ID code included in the first data matches any of the ID codes stored in the reception storage section 55, the reception control section 51 determines that the first data is authorized data. If the ID code included in the first data does not match any of the ID codes stored in the reception storage section 55, the reception control section 51 determines that the first data is non-authorized transmission data.

If the reception circuit 52 receives the second data, the reception control section 51 verifies the ID code based on the error detection code included in the second data. Thus, in the second data, the error detection code serves as the verification data. If the reception circuit 52 receives the second data, the reception control section 51 computes the error detection code from the second data, the ID code stored in the reception storage section 55, and the fixed bit. The computation of the error detection code is performed in the same manner as in the case of the transmitters 31. That is, the transmission storage section 35b and the reception storage section 55 store programs for computing the error detection code in the same manner.

The reception control section 51 computes an 8-bit error detection code from the ID code and the fixed bit stored in the reception storage section 55 in addition to the pressure data, the temperature data, and the status code included in the second data. Since the reception storage section 55 stores four ID codes corresponding to the four wheel assemblies 11, four error detection codes are computed. That is, error detection codes using FLID, FRID, RLID, and RRID are computed.

If the ID code (and the fixed bit) of the transmitter 31 matches an ID code (and the fixed bit) registered in the receiver 50, the error detection code included in the second data matches the error detection code computed by the reception control section 51. More specifically, the transmitter 31 and the receiver 50 compute the error detection code in the same manner. Among the pieces of data used for computing the error detection code, the pressure data, the temperature data, and the status code remain the same as long as no errors have occurred. If the ID code of the transmitter 31 that has transmitted the transmission data match the ID code in the receiver 50, the ID codes (and the fixed bits) also match each other. Thus, the same computation is performed using the same data. For this reason, the error detection codes, which are the computation data, match each other between the transmitter 31 and the receiver 50. Consequently, the ID code of the transmitter 31 is verified against the ID code in the receiver 50 by checking whether the error detection code, which is the computation data included in the second data, matches the error detection code computed by the reception control section 51.

For example, as illustrated in FIG. 9, assume that the reception storage section 55 stores ID codes (bit strings) as the FRID, FLID, RRID, and RLID.

As illustrated in FIG. 10, if the error detection codes (checksums) are computed using the FRID, FLID, RRID, and RLID, the error detection code computed using the FRID matches the error detection code included in the second data.

If the error detection code included in the second data matches any of the error detection codes computed by the reception control section 51, the reception control section 51 determines that the second data is authorized data. In contrast, if the error detection code included in the second data matches none of the error detection codes computed by the reception control section 51, the reception control section 51 determines that the second data is non-authorized data.

In the present embodiment, the reception control section 51 functions as an obtaining section, which obtains the verification data and the variable data from the transmission data. The reception control section 51 functions as verifying section, which performs verification based on the verification data and the ID codes stored in the reception storage section 55. The obtaining section (obtaining means) and the verifying section (verifying means) are implemented as functions of the reception control section 51.

In the present embodiment, the reception control section 51 computes the error detection code from data including the fixed bit in addition to the ID code. This is because the transmission control section 35 also computes the error detection code from data including the fixed bit. That is, the data that is used for the computation of the error detection code but is not included in the second data is not limited to the ID code. For example, the data that is used for the computation of the error detection code but is not included in the second data as in the present embodiment does not necessarily have to be only the ID code or may be the ID code and the fixed bit. The data that is used for the computation of the error detection code but is not included in the second data only needs to be the fixed values (fixed data) including at least the ID code and any data that can be stored in the reception storage section 55 and used for the computation of the error detection code. In the present embodiment, the ID codes and the fixed bit may be regarded as the fixed data.

The first data and the second data are distinguished by the difference in the data length between the first data and the second data.

As described above, the receiver 50 is capable of verifying the ID code in either the case in which the first data is received or the case in which the second data is received. In some cases, it is desired that the reception control section 51 identify the wheel assembly 11 (tire) with which the authorized data is associated. For example, in the case in which it is desired to display on the display 57 the wheel assembly 11 in which pressure anomaly has occurred or in the case in which it is desired to display on the display 57 the pressures of the respective wheel assemblies 11 as in the present embodiment, it is necessary to identify the wheel assembly 11 (tire) with which each piece of authorized data is associated. In other words, it is necessary to associate the ID codes of the respective transmitters 31 with the positions of the wheel assemblies 11.

A wheel assembly position identifying process for identifying the wheel assembly 11 to which each of the transmitters 31 is attached will now be described. The wheel assembly position identifying process is performed when the vehicle 10 is activated by a start switch, which switches the state of the vehicle 10 between an activated state and a deactivated state. The activated state of the vehicle 10 refers to a state in the vehicle 10 can travel through operation of the accelerator pedal, and the deactivated state of the vehicle 10 refers to a state in which the vehicle 10 will not travel even if the accelerator pedal is operated. For the illustrative purpose, it is assumed that only authorized data is received in the following description.

The reception storage section 55 stores combinations of two types of frame formats and specific bits that can be assumed by the transmission data transmitted from the transmitters 31. By acquiring the combination of the frame format and the specific bit, it is possible to identify the transmission mode of the transmitter 31 and a specific angle at which the transmission data was transmitted from the manner in which the data included in the transmitter 31 has been changed.

When obtaining transmission data, the reception control section 51 determines whether the received transmission data was transmitted at a specific angle. As described above, the specific bit of the transmission data transmitted at a specific angle is 1. Accordingly, it is possible to determine whether transmission data was transmitted at a specific angle depending on whether the specific bit is 1 or 0.

Also, the reception control section 51 determines whether transmission data transmitted at a specific angle was transmitted at the first angle or the second angle. The first data is transmitted at the first angle, and the second data is transmitted at the second angle. Therefore, the first data of which the specific bit is 1 can be determined to have been transmitted at the first angle, and the second data of which the specific bit is 1 can be determined to have been transmitted at the second angle.

The reception control section 51 obtains the pulse count value (the rotation angle of the wheel assembly 11) of each of the rotation sensor units 21 to 24 from the ABS controller 25 upon reception of the transmission data that was transmitted at specific angles. The reception control section 51 separately collects the pulse count values at the reception of the first data transmitted at the first angle and the pulse count values at the reception of the second data transmitted at the second angle.

The rotational speeds of the wheel assemblies 11 differ, for example, due to the influence of the differential gear. Accordingly, the relative positions of the transmitters 31 attached to the wheel assemblies 11 (the differences between the rotation angles of the wheel assemblies 11) change as the vehicle 10 travels. Also, assume that a transmitter 31 transmits transmission data at a specific angle. In this case, at the time of transmission of the transmission data, the rotation angle (the pulse count value corresponding to the rotation angle) detected by one of the rotation sensor units 21 to 24 that corresponds to the wheel assembly 11 to which the transmitter 31 that transmitted the transmission data is attached also matches the specific angle. That is, in a case in which the transmitters 31 transmit transmission data at specific angles, when a pulse count value is obtained upon reception of the transmission data, one of the rotation sensor units 21 to 24 has a small value of variation of the pulse count value.

Figure 11:
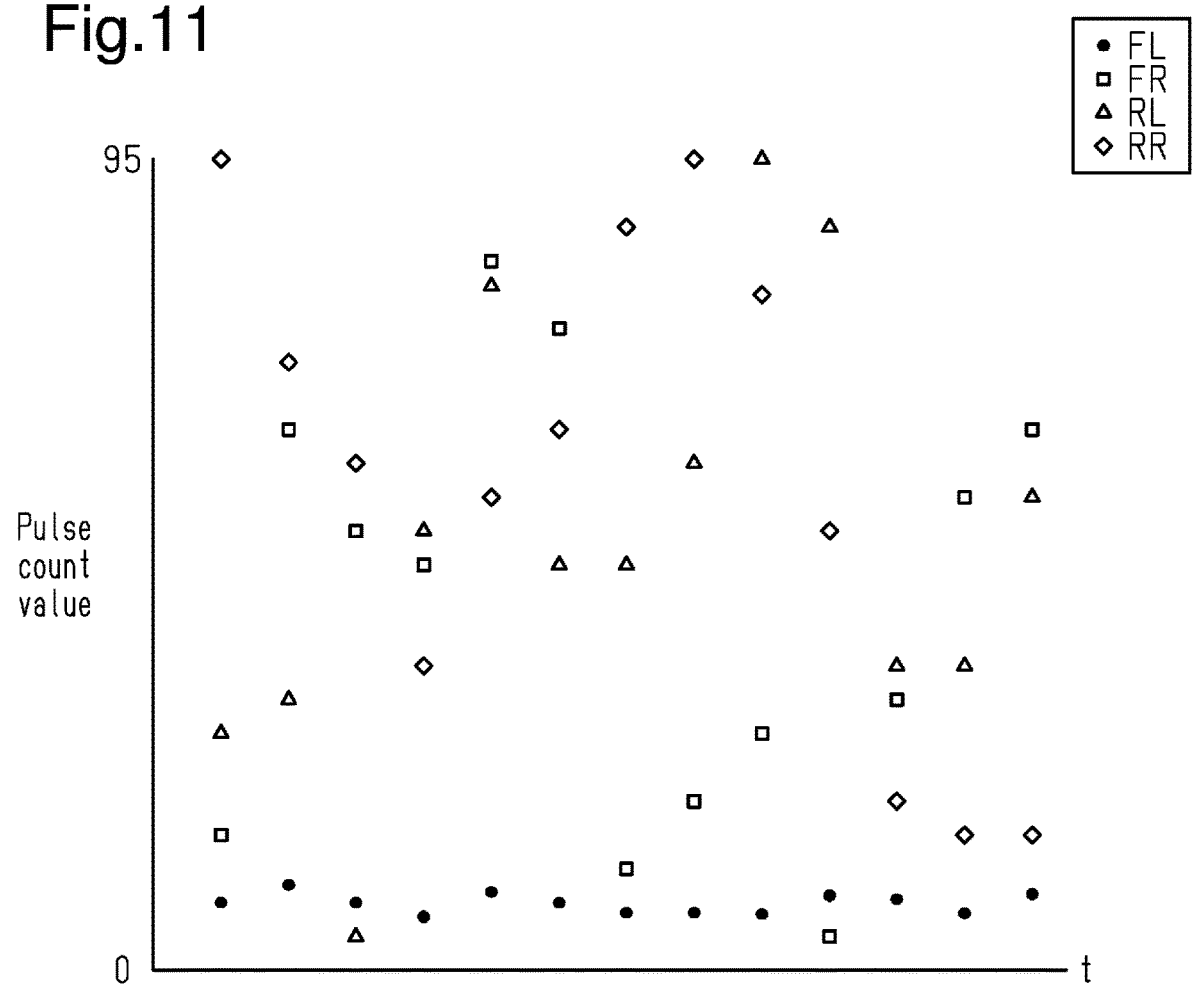
FIG. 11 is a schematic diagram illustrating pulse count values collected upon reception of the first data.

As shown in FIG. 11, focusing on the transmitter 31 of the FLID, it is assumed that this transmitter 31 transmitted transmission data at the first angle several times. When the reception control section 51 obtains pulse count values (the rotation angles of the wheel assemblies 11) of the rotation sensor units 21 to 24 from the ABS controller 25 upon reception of the transmission data, the variation of the pulse count value detected by the first rotation sensor unit 21 corresponding to the left front wheel assembly FL is the smallest. Therefore, the transmitter 31 of the FLID can be determined to be attached to the left front wheel assembly FL. In the present embodiment, the reception control section 51 functions as an identifying section that identifies the wheel assembly 11 to which each transmitter 31 is attached. It can be said that the identifying section (identifying means) is implemented as a function of the reception control section 51.

Figures 12, 13:
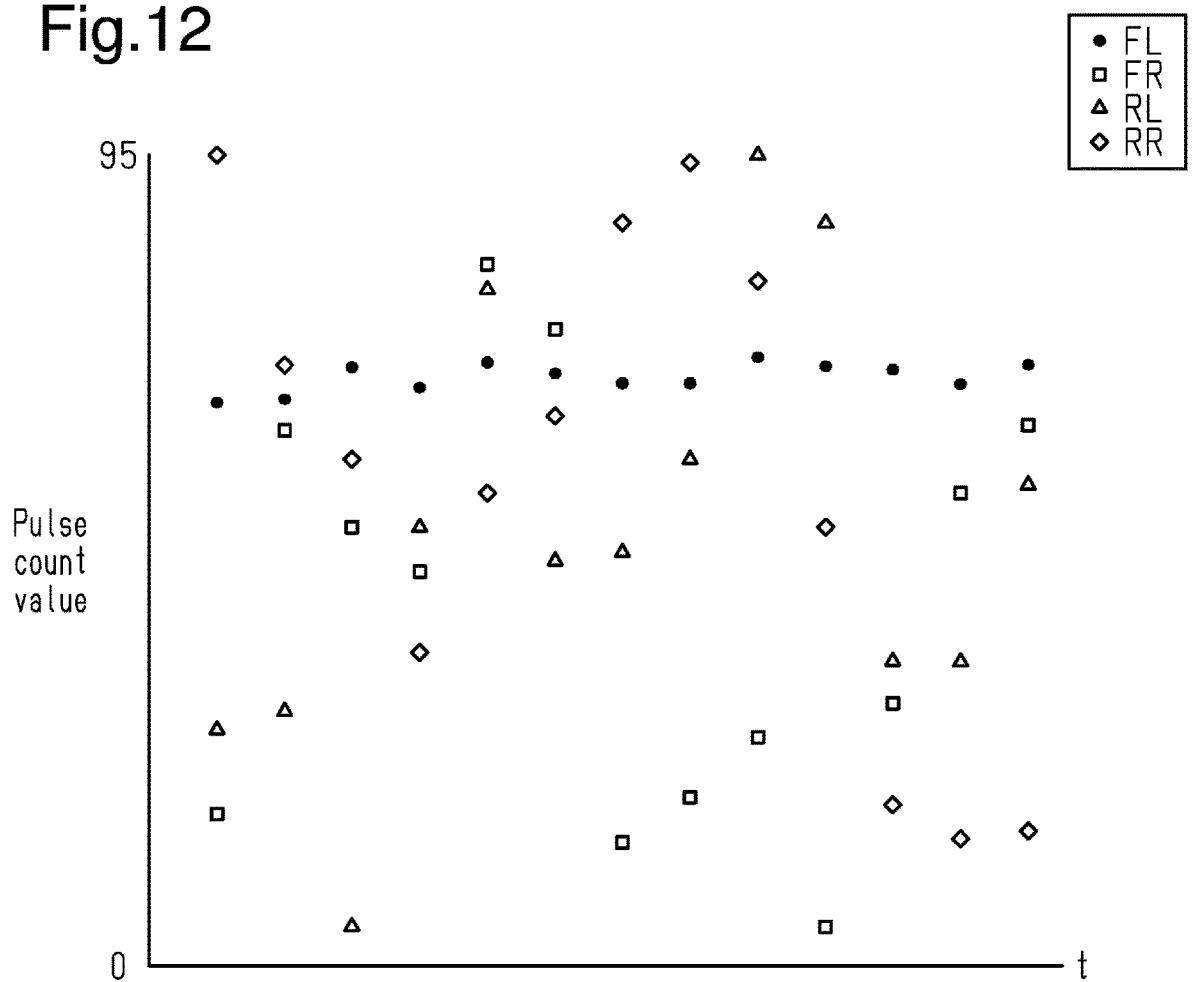
FIG. 12 is a schematic diagram illustrating pulse count values collected upon reception of the second data.
FIG. 13 is a diagram illustrating the correspondence between the transmission mode and the form of the transmission data in a third embodiment.

The same applies to the case in which the transmitter 31 of the FLID transmits transmission data at the second angle several times as shown in FIG. 12. If the reception control section 51 can receive either the first data transmitted at the first angle or the second data transmitted at the second angle, the reception control section 51 can identify the wheel assembly 11 to which the transmitter 31 is attached. The receiver 50 of the present embodiment is a wheel assembly position identifying apparatus, which performs the wheel assembly position identifying process.

The reception control section 51 identifies the wheel assembly 11 to which each of the four transmitters 31 is attached. The reception control section 51 associates the four ID codes with the positions of the respective wheel assemblies 11, stores the relationship in the reception storage section 55, and finishes the wheel assembly position identifying process.

For the illustrative purposes, the case is described in which the reception control section 51 determines whether transmission data transmitted at a specific angle was transmitted at the first angle or the second angle. However, the reception control section 51 only needs to recognize that the difference of the form of the transmission data, and does not need to recognize a specific angle at which the transmission data was transmitted. In the present embodiment, when receiving two or more pieces of the transmission data from the same transmitter 31, the reception control section 51 only needs to recognize whether the received transmission data is the first data or the second data to distinguish the pieces of the transmission data that were transmitted at the same specific angle. For example, when receiving the first data of which the specific bit is 1 two or more times, the reception control section 51 only needs to be able to recognize that these sets of the first data were transmitted at the same specific angle, but does not necessarily determine whether the data sets were transmitted at the first angle or the second angle.

Next, an operation of transmitters 31, the receiver 50, and the tire condition monitoring system 30 of the present embodiment will be described.

The transmitters 31 transmit transmission data at the first angle and the second angle. The reception control section 51 separately collects the pulse count values at the reception of the first data transmitted at the first angle and the pulse count values at the reception of the second data transmitted at the second angle, thereby identifying the position of the wheel assembly 11 in which the transmitter 31 is provided.

In order to determine the wheel assembly 11 to which each transmitter 31 is attached, transmission data of the same frame format may be alternately transmitted at the first angle and the second angle.

If the receiver 50 can recognize that the transmission data is alternately transmitted at the first angle and the second angle, the receiver 50 can collect the pulse count values for each piece of the transmission data transmitted at different angles, which are the first angle and the second angle. Further, in some cases, the transmission data cannot be received due to the communication environment or the like, and therefore transmission data transmitted at the first angle (or the second angle) is received successively. In this case also, since the interval of transmission of transmission data is known, it is possible to recognize that the transmission data transmitted at the same specific angle is received two consecutive times in a case in which the receiving interval of the transmission data is approximately twice the transmitting interval of the transmission data.

However, in a case in which the transmission data cannot be received for several consecutive times, it is difficult to identify the wheel assembly 11 to which each of the transmitters 31 is attached. This is because it cannot be determined whether the transmission data, which is received after the transmission data cannot be received for several consecutive times due to the accuracy of the timing function of the reception control section 51 or the like, is transmitted at the first angle or the second angle.

It may be considered that angular data indicating a specific angle is included in the transmission data. However, in this case, the data length may become long by the extent corresponding to the angular data. Also, if the angular data is shortened (for example, 1 bit) to prevent the data length from becoming too long, errors might not be detected although the angular data is incorrect when such errors occur simultaneously in the angular data and the error detection code. Consequently, the reception control section 51 may erroneously recognize that the transmission data transmitted at the second angle is received despite the fact that the transmission data transmitted at the first angle is received. This may increase the variation of the pulse count value and slow down or prevents the identification of the wheel assembly 11 to which each of the transmitters 31 is attached.

In this respect, the present embodiment acquires whether the transmission data was transmitted at the first angle or the second angle based on the data length. Thus, even if the angular data is included, it is possible to determine the rotation angle of the wheel assembly 11 at which the transmission data was transmitted.

Also, the specific angles are determined based on the data length. Thus, even if an error occurs in the transmission data, erroneous recognition of the specific angles at which the transmission data was transmitted is also prevented.

The above-described embodiment achieves the following advantages.

(1) The transmission control section 35 transmits transmission data at more than one specific angle. Thus, even if any of the specific angles matches the null point, the receiver 50 is allowed to receive the transmission data transmitted at a specific angle. This eliminates the situation in which, due to the influence of the null point, it is impossible to identify the wheel assembly 11 to which each transmitter 31 is attached.

By changing the data (data that does not indicate the rotation angle of the wheel assembly) different from the angular data in accordance with the specific angles, it is possible to determine whether the received transmission data was transmitted at the first angle or the second angle. Therefore, data included in the transmission data can also be used as data indicating the specific angle.

(2) The first angle and the second angle can be indicated by the presence or absence of the ID code, which is data different from the angular data. The data length of the second data, which includes no ID code, is shortened by the extent corresponding to the ID code. This reduces the consumption of power required to transmit the transmission data, so that the life of the battery 37 will be extended.

(3) By changing data that is not angular data for transmission data transmitted at different specific angles, the receiver 50 is allowed to determine whether transmission data was transmitted at the first angle or the second angle. Therefore, it is unnecessary to perform transmission by including angular data in transmission data, and it is possible to shorten the data length as compared with the case in which transmission data including angular data is transmitted. This reduces the consumption of power required to transmit the transmission data, so that the life of the battery 37 will be extended.

(4) Transmission data is recognized as data that was transmitted at the same specific angle based on the data length. Thus, even if an error occurs in the transmission data, erroneous recognition of the specific angles at which the transmission data was transmitted is prevented. Therefore, even when the communication environment is not favorable and errors tend to occur in transmission data, erroneous recognition of specific angles is prevented.

(5) The reception control section 51 can recognize a specific angle at which transmission data was transmitted based on the manner in which the data included in the transmission data was changed. Thus, the reception control section 51 can collect pulse count values for each piece of transmission data transmitted at the same specific angle upon reception of the transmission data. Based on the variation of the collected pulse count values, it is possible to identify the wheel assembly 11 to which each transmitter 31 is attached.

(6) The reception control section 51 is capable of verifying the ID code in either the case in which the first data is received or the case in which the second data is received. Thus, based on the presence or absence of the ID code, it is possible to separately collect pulse count values for each piece of transmission data transmitted at the same specific angle upon reception of the transmission data.

(7) The data length of the second data is shorter than that of the first data. Therefore, as compared with the first data, errors are less likely to occur in the data (code) of the second data until it is received by the reception circuit 52.

(8) The tire condition monitoring system 30, which includes the transmitters 31 and the receiver 50, can perform transmission and reception regardless whether the transmission data is the first data or the second data. It is possible to identify the wheel assembly 11 to which each transmitter 31 is attached according to the manner in which the data included in the transmission data was changed. Therefore, the tire condition monitoring system 30 achieves the above-described advantages (1) to (7).

Second Embodiment

A transmitter, a receiver, and a transmission-reception system according to a second embodiment will now be described. In the following description, the same parts as those of the transmitters, the receiver, and the transmission-reception system according to the first embodiment will be denoted by the same reference numerals as those of the first embodiment, and description thereof will be omitted.

In the second embodiment, two ID codes are stored in the transmission storage section 35b of each transmitter 31. One of the two ID codes is defined as a first ID code and the other is defined as a second ID code. The transmission control section 35 includes the first ID code in the transmission data when transmitting the transmission data at the first angle. The transmission control section 35 includes the second ID code in the transmission data when transmitting the transmission data at the second angle. That is, the ID code in the transmission data is changed in accordance with the specific angle. In the second embodiment, the first data is used as transmission data.

The reception storage section 55 stores two sets of ID codes registered in each transmitter 31, that is, first ID codes and second ID codes. When receiving transmission data including a first ID code, the reception control section 51 recognizes that the transmission data was transmitted at the first angle. When receiving transmission data including a second ID code, the reception control section 51 recognizes that the transmission data was transmitted at the second angle. That is, when receiving transmission data including the same ID code two or more times, the reception control section 51 can recognize that the transmission data received two or more times was transmitted at the same specific angle. When receiving transmission data, the reception control section 51 performs verification in accordance with the number of ID codes registered in the transmission storage section 35b. More specifically, regardless whether it has received the first ID code or the second ID code, the reception control section 51 performs two types of verification. That is, the reception control section 51 verifies the received ID code against the first ID codes stored in the reception storage section 55 and against the second ID codes stored in the reception storage section 55.

The above-described embodiment achieves the following advantage.

(9) By transmitting transmission data including an ID code that differs in accordance with the specific angle, the reception control section 51 can collect pulse count values for each piece of transmission data transmitted at the same specific angle upon reception of the transmission data. As a result, the reception control section 51 can identify the wheel assembly 11 to which each transmitter 31 is attached.

Third Embodiment

A transmitter, a receiver, and a transmission-reception system according to a third embodiment will now be described. In the following description, the same parts as those of the transmitters, the receiver, and the transmission-reception system according to the first embodiment will be denoted by the same reference numerals as those of the first embodiment, and description thereof will be omitted.

In the third embodiment, the manner of computation of the error detection code or the error correction code varies in accordance with the specific angle at which transmission data is transmitted. First, a case in which a checksum is used as the error detection code will be described.

As shown in FIG. 13, when performing the normal transmission, the transmission control section 35 computes a checksum in the same manner of computation as the first embodiment. That is, the checksum is the sum of multiple pieces of data combined to form 8-bit data. For example, transmission is performed with the transmission data including 00010111 like the checksum shown in FIG. 8A.

When transmitting transmission data at the first angle in the specific angle transmission, the transmission control section 35 performs, in addition to the manner of computation of the normal transmission, a computation for inverting the upper 4 bits of data computed in the manner of computation of the normal transmission. For example, if the checksum computed at the time of normal transmission is 00010111 when transmission data having the same data except for the error detection code is transmitted, the checksum included in the transmission data transmitted at the first angle is 11100111.

When transmitting transmission data at the second angle in the specific angle transmission, the transmission control section 35 performs, in addition to the manner of computation of the normal transmission, a computation for inverting the lower 4 bits of data computed in the manner of computation of the normal transmission. For example, if the checksum computed at the time of normal transmission is 00010111 when transmission data having the same data except for the error detection code is transmitted, the checksum included in the transmission data transmitted at the second angle is 00011000.

When transmitting transmission data at a non-specific angle (a failure of detection of specific angles) in the specific angle transmission, the transmission control section 35 performs, in addition to the manner of computation of the normal transmission, a computation for inverting all the 8 bits of data computed in the manner of computation of the normal transmission. For example, if the checksum computed at the time of normal transmission is 00010111 when transmission data having the same data except for the error detection code is transmitted, the checksum included in the transmission data transmitted at the second angle is 11101000.

The reception storage section 55 stores the manner of computation of the checksum performed by the transmission control section 35. As with the transmission control section 35, the reception control section 51 can compute the checksum. When receiving transmission data, the reception control section 51 computes a checksum from the data included in the transmission data. In the present embodiment, the transmission control section 35 computes four types of checksums in four types of manners of computation, so that the reception control section 51 computes four types of checksums. By checking whether the checksums match, the reception control section 51 can recognize the mode of the transmitter 31 and the specific angles. For example, if the reception control section 51 obtains the transmission data shown in FIG. 8A, the reception control section 51 computes four types of checksums, which are 00010111, 11100111, 00011000, and 11101000. If the computed checksum is 00010111 and the checksum included in the transmission data is also 00010111, the reception control section 51 can determine that transmission data was transmitted in the normal transmission. If the computed checksum is 11100111 and the checksum included in the transmission data is also 11100111, the reception control section 51 can determine that transmission data was transmitted at the first angle. Similarly, determination can be made on the second angle and transmission data transmitted at a non-specific angle.

When a CRC code is used as the error detection code, the CRC code is computed using different CRC generator polynomials. FIG. 14 shows examples of the CRC generator polynomials. When the CRC generator polynomial is different, the CRC code to be operated also differs.

When receiving transmission data, the reception control section 51 computes a CRC code from the data included in the transmission data. The computation of the CRC code is performed using the same manner of computation as the manner of computation performed by the transmission control section 35, that is, using the generator polynomials shown in FIG. 14. Thus, as in the case of checksums, by checking whether the CRC code included in the transmission data matches the CRC code computed by the reception control section 51, the reception control section 51 can recognize the mode of the transmitter 31 and the specific angles.

This configuration achieves the following advantage.

(10) By using an error detection code that is computed according to a manner of computation that varies in accordance with the specific angle, the reception control section 51 can collect pulse count values for each piece of transmission data transmitted at the same specific angle upon reception of the transmission data. As a result, the reception control section 51 can identify the wheel assembly 11 to which each transmitter 31 is attached.

The embodiments may be modified as follows.

In the first embodiment, instead of the presence or absence of the ID code, the data length may be changed depending on the presence or absence of the payload data. When transmitting transmission data at the first angle, the transmission control section 35 performs transmission including the pressure data and the temperature data. When transmitting transmission data at the second angle, the transmission control section 35 performs transmission while omitting at least one of the pressure data and the temperature data. This differentiates the data length of the transmission data transmitted at the first angle and the data length of the transmission data transmitted at the second angle from each other. When transmission data is transmitted at the first angle, the payload data is transmitted. This prevents the reception control section 51 from being incapable of acquiring the state of the tires 13 over a long period of time.

Also, as in the first embodiment, when the data length of the temperature data is different from the data length of the pressure data, transmission data from which the temperature data is omitted may be transmitted at the first angle, and transmission data from which the pressure data is omitted may be transmitted at the second angle.

In the first embodiment, data different from the error detection code may be used as the computation data. For example, the computation data may be exclusive OR data, which is an exclusive OR of at least one of ID1 to ID4, which are pieces of data obtained by dividing the ID code, and at least one of pieces of variable data. That is, the computation data computed from the fixed data and variable data may refer to the data computed from part of the fixed data and part of the variable data or may refer to the data computed from all of the fixed data and all of the variable data.

Since ID1 to ID4 are stored in the reception storage section 55, the reception control section 51 can compute the exclusive OR data from at least one of ID1 to ID4 stored in the reception storage section 55 and at least one of the pieces of variable data included in the second data. In this case, the receiver 50 and the transmitters 31 associated with the receiver 50 compute the exclusive OR from the same data. More specifically, the transmission storage section 35*b* and the reception storage section 55 store a program that computes the exclusive OR data using the same data. In this case, the error detection code is computed from the data including the exclusive OR data.

In a case in which the above-described exclusive OR data is used as the computation data, the second data may, but does not necessarily have to, include the error detection code.

If the second data includes both the exclusive OR data and the error detection code, both the exclusive OR data and the error detection code may serve as the computation data (verification data). More specifically, the transmission control section 35 generates the second data that includes the exclusive OR data and the error detection code but does not include the ID code. Upon the obtainment of the second data, the reception control section 51 computes the exclusive OR data and the error detection code from the variable data included in the second data and the ID code stored in the reception storage section 55. If the exclusive OR data included in the second data matches the computed exclusive OR data, and the error detection code included in the second data matches the computed error detection code, the reception control section 51 determines that the second data is authorized data.

Instead of the exclusive OR data, data computed by a given method from at least one of ID1 to ID4, which are the pieces of data obtained by dividing the ID code, and at least one of the pieces of variable data may be used as the computation data. As long as the transmission control section 35 and the reception control section 51 perform the computation by the same method, any computation method may be employed to verify the ID code. Thus, as long as the same computation is performed in the transmitter 31 and the receiver 50 that are associated with each other, any manner of computation may be employed.

In the first embodiment, the transmission data may include a shuffling pattern. The shuffling pattern refers to data for shuffling the ID codes according to specified rules. For example, specific bits of ID1 to ID4 are inverted by the rules defined by the shuffling pattern. Therefore, the transmission control section 35 changes the manner of computation of the error detection code according to the shuffling pattern. In this case, the reception control section 51 checks matching of the error detection code by computing the error detection code according to the shuffling pattern included in the transmission data.

In the first embodiment, the transmission control section 35 may transmit transmission data in which all bits of the first data transmitted at the first angle are inverted (0s and 1s are interchanged) at the second angle. In this case, the fixed bits are different between the transmission data transmitted at the first angle and the transmission data transmitted at the second angle. Since the fixed bits are fixed data, the fixed bits remain the same unless inverted. Therefore, by checking the fixed bits, it is possible to check whether the transmission data is inverted. The reception control section 51 can determine whether the transmission data has been inverted based on the fixed bits. The reception control section 51 can recognize that the transmission data was transmitted at the first angle if the transmission data is not inverted and that the transmission data was transmitted at the second angle if the transmission data is inverted.

In the first embodiment, the second data may be transmitted in the normal transmission. In this case, since the data length of the transmission data transmitted in the normal transmission is shortened, the power consumption of the battery 37 at the transmission of transmission data is reduced. In this case, the transmission data that is transmitted when the detection of a specific angle has failed may be either as the first data or the second data. If the transmission data transmitted at a failure of detection of a specific angle remains the second data, both the frame format and the specific bit coincide between the transmission data transmitted during the normal transmission and the transmission data transmitted at a failure of detection of a specific angle.

The wheel assembly position identifying process only needs to determine whether the transmission data is transmitted at the specific angle. Since transmission data is transmitted at a non-specific angle at the time of the normal transmission and at the time of a failure of detection of a specific angle, the form of the transmission data may be the same. That is, it can be said that at least the number of manners in which transmission data is changed (patterns) is sufficient if it is greater than the number of the specific angles by one.

In the first embodiment, the number of bits (data length) of the error detection code may be changed as required as long as it is less than the number of bits (data length) of the ID code. For example, the error detection code may be 16 bits.

In the first embodiment, the first data and the second data may have different values for the preamble and the stop bit. In this case, the reception control section 51 may distinguish whether the transmission data is the first data or the second data based on the preamble and the stop bit.

In the second embodiment, the transmission storage section 35*b* may store a single ID code. In this case, as shown in FIG. 15, part of the ID code is inverted according to the transmission mode and the specific angle. The transmission control section 35 transmits transmission data without changing the ID code when performing the normal transmission. When transmitting transmission data at the first angle in the specific angle transmission, the transmission control section 35 inverts ID1 and transmits the transmission data. For example, in the case of the ID code shown in FIG. 8A, ID1 is changed from 11111110 to 00000001, and the transmission data is transmitted without changing ID2, ID3, and ID4. Likewise, when transmitting transmission data at the second angle in the specific angle transmission, the transmission control section 35 inverts ID2. When the detection of a specific angle has failed in the specific angle transmission, the transmission control section 35 inverts ID3.

The reception control section 51 recognizes the transmission mode and the specific angles from the four patterns that can be assumed by the ID codes. Thus, the reception control section 51 can identify the wheel assembly 11 to which each transmitter 31 is attached by collecting pulse count values for each piece of transmission data transmitted at the same specific angle upon reception of the transmission data.

In this case, the ID codes of the transmitters 31 are set to be different from each other by inverting part of the ID codes. That is, the ID codes of the transmitter 31 are set so as not to be the same even if part of an ID code is inverted.

In the second embodiment, the transmission storage unit 35b may store a single ID code. In this case, the first ID code may be an ID code (all bits) stored in the transmission storage section 35b, and the second ID code may be a part of the first ID code. For example, the second ID code may be the lower 16 bits or the upper 16 bits of the first ID code. In the normal transmission, the transmission data including the first ID code is transmitted.

When receiving the second ID code, the reception control section 51 verifies the second ID code against the ID code stored in the reception storage section 55. For example, when the upper 16 bits of the first ID code are used as the second ID code, the reception control section 51 verifies the upper 16 bits of the ID code stored in the reception storage section 55 against the second ID code. When these match, the reception control section 51 determines that the transmission data is authorized data. Therefore, the reception control section 51 performs the verification in a plurality of manners. Based on the verification result, the reception control section 51 collects pulse count values for each piece of transmission data transmitted at the same specific angle upon reception of the transmission data.

In this case, the first ID codes of the transmitters 31 are set such that the second ID codes are different from each other. For example, when the upper 16 bits of the first ID code are set as the second ID code, the first ID codes are set such that the upper 16 bits of the first ID codes of the transmitters 31 are different.

In the second embodiment, the transmission data may be the second data. In this case, the second data transmitted at the first angle includes the error detection code computed using the first ID code, and the second data transmitted at the second angle includes the error detection code computed using the second ID code. That is, the manner in which the transmission data is changed in the first embodiment and the manner in which the transmission data is changed in the second embodiment may be used together.

In the first embodiment, the manner of computation of the error detection code may be different from that of the first data. For example, the second data in which ID1 is inverted (0s and 1s are interchanged) may be transmitted. That is, the manner in which the transmission data is changed in the first embodiment and the manner in which the transmission data is changed in the third embodiment may be used together. In addition, it is also possible to concurrently use the manner in which the transmission data is changed in the first embodiment, the manner in which the transmission data is changed in the second embodiment, and the manner in which the transmission data is changed in the third embodiment. Specifically, it is possible to use an ID code different from the first data and transmit the first data and the second data that is computed in the manner different from that of the first data in accordance with the specific angles.

In the third embodiment, the transmission control section 35 may use different error detection codes (or error correction codes) depending on the specific angles. For example, when transmitting transmission data at the first angle, the transmission control section 35 may use an error detection code as the checksum. When transmitting transmission data at the second angle, the transmission control section 35 may use an error detection code as the CRC code. When the error detection code is different, the manner of computation of the error detection code is also different. Therefore, the manner of computation varies depending on the specific angles.

In each embodiment, the number of the specific angles may be set to three or more. In this case, each one of the pieces of the transmission data transmitted at three specific angles is changed in accordance with the specific angle of data different than the angular data. For example, the transmission data of the first embodiment and the transmission data of the second embodiment may be combined. When transmission is performed at the first angle, the first data including the first ID code is transmitted. When transmission is performed at the second angle, the second data including an error detection code computed using the first ID code is transmitted. When transmission is performed at a third angle, which is one of a plurality of specific angles and is different from the first angle and the second angle, the second data including the second ID code is transmitted. When transmission is performed at a fourth angle, which is different from the first angle, the second angle, and the third angle, the second data including an error detection code computed using the second ID code is transmitted.

In this case also, the reception control section 51 recognizes a specific angle at which the transmission data was transmitted based on the manner in which of the transmission data transmitted by the transmission control section 35 was changed. The reception storage section 55 stores the forms that can be assumed by the transmission data.

In each of the embodiment, the reception storage section 55 may store the ID codes of the transmitters 31 attached to the wheel assemblies 11 and the ID code of the transmitter 31 attached to the spare tire. Further, the reception storage section 55 may store both of the ID codes of the transmitters 31 attached to summer tires and the ID code of the transmitters 31 attached to winter tires. In this case, the reception control section 51 may execute informing of an abnormality of the tires 13 corresponding to the ID codes of the four wheel assemblies from which the transmission data is transmitted most frequently.

In each embodiment, the vehicle 10 only has to include multiple wheel assemblies 11, and for example, the vehicle 10 may be a motorcycle.

In each embodiment, the transmission data may include angular data. In this case, the reception control section 51 can recognize a specific angle at which the transmission data was transmitted from both the angular data and the manner in which data different from the angular data was changed. Since the specific angle is recognized based on whether these two pieces of data match, erroneous detection of a specific angle is prevented.

In each embodiment, the data included in the transmission data may be changed as necessary. For example, the acceleration data detected by the acceleration sensor 34 may be included in the transmission data.

In each embodiment, the transmission control section 35 may change the frequency of the transmission data in accordance with the specific angles. The transmission control section 35 may change the bit rate of the transmission data or the modulation method in accordance with the specific angles.

DESCRIPTION OF THE REFERENCE NUMERALS

10 . . . Vehicle; 11 . . . Wheel Assemblies; 21 to 24 . . . Rotation Sensor Units (Rotation Angle Detecting Section);

30 . . . Tire Condition Monitoring System (Transmission-Reception System); 31 . . . Transmitters; 35 . . . Transmission Control Section (Control Section); 35b . . . Transmission Storage Section; 36 . . . Transmission Circuit (Transmission Section); 50 . . . Receiver; 51 . . . Reception Control Section (Verifying Section And Identifying Section); 52 . . . Reception Circuit (Reception Section); 55 . . . Reception Storage Section.

The invention claimed is:

1. A transmitter that is provided in each wheel assembly of a vehicle and is configured to be capable of transmitting transmission data to a receiver mounted in the vehicle, the vehicle having a rotation angle detecting section that detects a rotation angle of each of the wheel assemblies as a detection value, the transmitter comprising:
 a transmission storage section, which stores identification information;
 a transmission section, which is configured to transmit the transmission data including verification data, which is used by the receiver to verify the identification information stored in the transmission storage section against identification information of each transmitter registered in the receiver; and
 a control section, which is capable of performing specific angle transmission, in which the control section causes the receiver to identify the wheel assembly to which the corresponding transmitter is attached by causing the transmission section to transmit the transmission data when detecting that the rotation angle of the corresponding wheel assembly is any one of a plurality of predetermined specific angles,
 the control section is configured to cause the receiver to collect the detection values, which are detected by the rotation angle detecting section, upon reception of the transmission data for each piece of the transmission data transmitted at the same specific angle by changing, at the performance of transmission at the specific angle, data that is different from angular data indicating the rotation angle of the wheel assembly and is included in the transmission data in accordance with the specific angle.

2. The transmitter according to claim 1, wherein, in accordance with the specific angle, the control section changes data that is used as the verification data between the identification information and computation data, which is computed from the identification information and variable data that may have different values, the computation data having a data length shorter than that of the identification information.

3. The transmitter according to claim 1, wherein the control section changes the identification information in the data included in the transmission data in accordance with the specific angle.

4. The transmitter according to claim 1, wherein the control section changes a manner of computation of an error detection code or an error correction code in accordance with the specific angle.

5. A receiver that is mounted on a vehicle having a rotation angle detecting section that detects rotation angles of respective wheel assemblies, wherein a transmitter is attached to each wheel assembly, the receiver being configured to be capable of identifying the wheel assembly to which each transmitter is attached, the receiver comprising:
 a reception storage section, which stores identification information registered in each transmitter;
 a reception section, which is configured to be capable of receiving transmission data, which is transmitted from the transmitter, which is capable of transmitting the transmission data when detecting that the rotation angle of the corresponding wheel assembly is any one of a plurality of predetermined specific angles; and
 an identifying section, which collects the detected values detected by the rotation angle detecting section upon reception of the transmission data and identifies the wheel assembly to which each transmitter is attached based on a variation of the detection values,
 wherein the identifying section collects the detection values for each piece of the transmission data transmitted at the same specific angle based on a manner in which data that is different from angular data indicating the rotation angle of the wheel assembly and is included in the transmission data received by the reception section is changed in accordance with the specific angle.

6. The receiver according to claim 5, further comprising a verifying section, which performs a verification process to verify the identification information registered in the transmitter that has transmitted the transmission data against the identification information stored in the reception storage section based on verification data included in the transmission data received by the reception section and the identification information stored in the reception storage section,
 the verification data is the identification information registered in the transmitter or computation data that is computed from the identification information registered in the transmitter and variable data that may have different values, the computation data having a data length shorter than that of the identification information registered in the transmitter,
 when receiving the identification information as the verification data, the verifying section performs the verification process based on the received identification information and the identification information stored in the reception storage section,
 when receiving the computation data as the verification data, the verifying section performs the verification process based on the computation data and data computed from the variable data included in the transmission data and the identification information stored in the reception storage section, and
 the identifying section collects the detection values for each piece of the transmission data transmitted at the same specific angle based on a manner in which the data length of the transmission data is changed in accordance with the specific angle.

7. The receiver according to claim 5, wherein the identifying section collects the detection values for each piece of the transmission data transmitted at the same specific angle based on verification of identification information that is included in the received transmission data and varies in accordance with the specific angle against the identification information stored in the reception storage section.

8. The receiver according to claim 5, wherein the identifying section computes an error detection code or an error correction code in a plurality of manners of computation from the transmission data received by the reception section, and the identifying section collects the detection values for each piece of the transmission data transmitted at the same specific angle based on comparison between the code obtained through the computation and an error detection code or an error correction code that is included in the transmission data and is computed in a manner of computation that varies in accordance with the specific angle.

9. A transmission-reception system comprising:
a plurality of transmitters, which are each provided in a wheel assembly of a vehicle having a rotation angle detecting section that detects, as a detection value, a rotation angle of each of a plurality of wheel assemblies, the transmitter being configured to transmit transmission data; and
a receiver, which receives the transmission data and is configured to be capable of identifying the wheel assembly to which each transmitter is attached, wherein
each transmitter includes
 a transmission storage section, which stores identification information,
 a transmission section, which is configured to transmit the transmission data including verification data, which is used by the receiver to verify the identification information stored in the transmission storage section against identification information of each transmitter registered in the receiver; and
 a control section, which causes the transmission section to transmit the transmission data when detecting that the rotation angle of the corresponding wheel assembly is any one of a plurality of predetermined specific angles,
 the control section changes, at the performance of transmission at the specific angle, data that is different from angular data indicating the rotation angle of the wheel assembly and is included in the transmission data in accordance with the specific angle,
the receiver includes
 a reception storage section, which stores identification information registered in each transmitter,
 a reception section, which is configured to be capable of receiving the transmission data, and
 an identifying section, which collects the detected values detected by the rotation angle detecting section upon reception of the transmission data and identifies the wheel assembly to which each transmitter is attached based on a variation of the detection values, and
the identifying section collects the detection values for each piece of the transmission data transmitted at the same specific angle based on a manner in which data included in the transmission data is changed in accordance with the specific angle.

* * * * *